Figure 1:
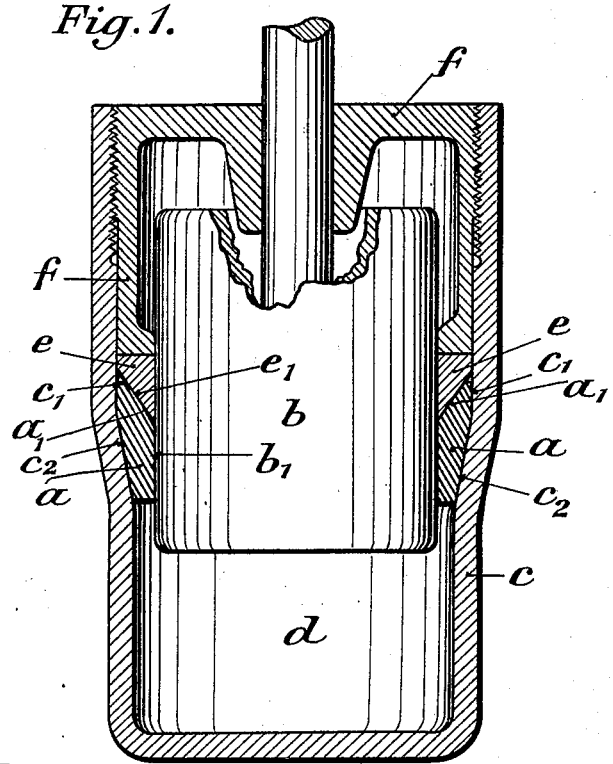

April 22, 1930. F. FAUDI 1,755,436

STUFFING BOX

Filed Feb. 1, 1928

INVENTOR:
Fritz Faudi
BY
ATTORNEY.

Patented Apr. 22, 1930

1,755,436

UNITED STATES PATENT OFFICE

FRITZ FAUDI, OF SOMMERDA, GERMANY

STUFFING BOX

Application filed February 1, 1928, Serial No. 250,985, and in Germany July 6, 1927.

The invention relates to the packing of stuffing boxes such as are used for instance in shock absorber cylinders mounted on the running gear of motor cars and in which a plunger reciprocates in a cylinder enclosing it and containing compressed air. In my patent application Ser. No. 183,800 filed April 14, 1927 it has already been proposed for tightening the elements of such pneumatic shock absorbers to use a packing ring of elastic deformable material having one of its faces lying in contact with an abutment formed by a cover screwed into the cylinder and its other face exposed to the pressure in the pressure chamber, whereby the inner periphery of the packing ring being formed to snugly embrace the plunger and the outer periphery being tapered to conform to the tapered portion of the wall of the pressure chamber and lying in contact therewith. By the pressure of the pressure medium the material of the packing ring is pressed against the cylinder wall as well as deformed and stretched in its middle portion. Hereby packing material is automatically displaced in the direction towards the annular abutment at the point of juncture of the pressure chamber and the plunger receiving chamber as well as in the other direction towards the pressure chamber. As the hollow space of the stuffing box tapers towards the pressure chamber, the free end of the packing ring is pressed into the tapering part of the hollow space which is of smaller cross section than that of the packing ring.

The object of the invention is to further improve devices of the character described above so as to assure a better tightening effect and to obtain more security against the escape of compressed air or liquid.

To obtain this end the face of the packing ring directed towards the screwed cover is also formed tapered, so that by the lengthening of the middle portion of the ring, due to the action of the pressure medium and the resulting displacement of the material to both sides, a ring of conical shape is pressed into a correspondingly formed hollow space. According to the shape of the packing ring and the hollow space receiving the ring, the tightening effect may be particularly directed and improved towards the outer wall, the cylinder wall, or towards the inner wall, the plunger wall, or simultaneously towards the outer and inner walls.

Figure 2:
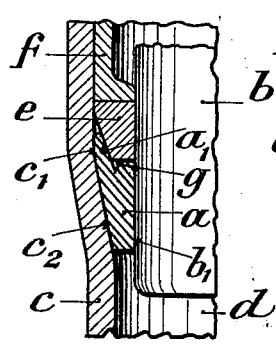
Figure 3:
Figure 4:
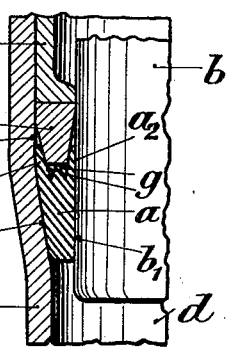

In order to allow of my invention to be more easily understood, some embodiments of same are illustrated by way of example in the drawings which accompany and form part of this specification. In these drawings:

Fig. 1 is a longitudinal section through a shock absorber according to the invention, Figs. 2–4 show broken away longitudinal sections through packing rings of different form.

According to the construction shown in Fig. 1 the packing ring $a$ of elastic deformable material is arranged in a hollow annular space the inner wall of which is formed by the cylindrical outer surface $b_1$ of the plunger $b$, while the outer wall of the said space is formed by the inner wall of the cylinder $c$ which from an upper cylindrical face $c_1$ merges towards the compressed air chamber $d$ into a conically shaped face $c_2$. The hollow space of the stuffing box is limited towards the upper part by a packing ring $e$, arranged in front of the annular front edge of the cover $f$ screwed into the cylinder $c$ and provided with a conically shaped outer surface $e_1$, facing the packing ring $a$. The arrangement of a special intermediate ring $e$ has the purpose of preventing rotation of the cover $f$ during the first and eventual later adjustments and thereby reduces friction and wear of the packing ring $a$ at the contacting faces. The form of the hollow space of the stuffing box so constructed corresponds to the form of the packing ring $a$ which therefore abuts with its inner and outer shell surfaces against the plunger face $b_1$ and the cylinder faces $c_1$, $c_2$ and with its edge facing the entrance place of the plunger $b$ against the conical shell face $e_1$, of the ring $e$. Towards the compressed air chamber $d$ the packing ring $a$ terminates in a flat or curved surface.

During assembling the packing ring $a$ is by screwing in the cover $f$ pressed with moderate pressure into the hollow space, whereby its material is pressed against the corresponding faces of the plunger $b$, the cylinder $c$ and the ring $e$. The air pressure prevailing in the compressed air chamber $d$ acts upon the free edge of the packing ring $a$ and compresses said ring a little in the longitudinal direction which causes the formation of an annular gap at the conical outer face. The compressed air entering at this place on the one hand presses the packing ring in the manner of a packing collar against the plunger surface $b_1$ and on the other hand deforms and lengthens the middle portion of the packing ring $a$, whereby the material of the packing ring is automatically displaced in a direction towards the compressed air chamber as well as towards the cover $f$. Hereby the annular wedge shaped projection $a_1$ of the packing $a$ is pressed into its tapering hollow bearing and against the cylinder walls $c_1$, so that the air which has entered the above mentioned annular gap between the packing ring $a$ and the cylinder wall $c_2$ is prevented from passing to the cover $f$.

In the construction shown in Fig. 2 the outermost portion of the end of the packing ring $a$ facing the cover $i$ terminates in an annular projection $a_1$ of wedge-shaped cross section, while the inner portion terminates in a circular annular edge arranged at right angles to the longitudinal axis of the stuffing box. The bearing faces of the ring $e$ contacting with the corresponding faces of the packing ring $a$ are formed in the same manner. Hereby, when screwing in the cover $f$ for the first time, the packing ring $a$ receives from the beginning and permanently the proper position and seating in the hollow space of the stuffing box which under uniform preliminary compression of the packing material assures a reliable bearing and abutment against the surfaces $b_1$, $c_1$, $c_2$ to be tightened.

To improve the tightening action towards the inner side, i. e. towards the plunger wall $b_1$, also the end of the packing ring $a$ opposite that facing the compressed air chamber $d$ is, as shown in Fig. 3, at the outer as well as at the inner side provided with an annular projection $a_1$ and $a_2$ respectively of wedge-shaped tapering cross section. As illustrated in Fig. 4 a flat circular annular edge may, for the purpose described above, be arranged between the two projections. The wedge angles of these two annular projections may be equal (Fig. 4) or different from each other (Fig. 3). Preferably the wedge angle of the outer annular projection $a_1$ is more acute than that of the inner projection $a_2$, whereby a greater bearing pressure for the tightening end towards the outer side against the cylinder wall $c_1$ is produced than towards the inner side against the movable plunger. Annular recesses or grooves $g$ at the bottom of the projections $a_1$ and $a_2$ of the packing ring $a$ opposite the edges of the bearing ring $e$ facilitate the pressing in of the annular projections $a_1$ and $a_2$ in the direction of the tapering of the hollow spaces of the stuffing box.

I claim:—

1. A packing for use in connection with cushioning devices employing a casing having a pressure chamber and a plunger receiving chamber opening at one end into the inner end of the pressure chamber, an annular abutment at the point of juncture of said chambers, the wall of the plunger receiving chamber being longitudinally tapered in advance of said abutment and between the same and the pressure chamber, and a plunger movable between said chambers, said packing comprising a packing ring of elastic material having one of its faces exposed to the pressure in the pressure chamber and a backing ring lying in contact with the other face of the packing ring and against said abutment, the contacting faces of said packing ring and said backing ring being wedge-shaped, and the inner periphery of said packing ring being formed to snugly embrace the plunger and the outer periphery of said packing ring being tapered to conform to the tapered portion of the wall of the pressure chamber and lying in contact therewith.

2. Packing of the character set forth in claim 1 wherein that portion of the packing ring lying in contact with the backing ring is of wedge-shaped tapering cross section while that portion of the packing ring lying in advance of the backing ring terminates in an annular edge arranged substantially at right angles to the longitudinal axis of the casing, the face of the backing ring engaging the said wedge-shaped tapering face of the packing ring being correspondingly tapered, the inner periphery of said packing ring being formed to snugly embrace the plunger and the outer periphery of said packing ring being tapered to conform to the tapered portion of the wall of the pressure chamber and lying in contact therewith.

3. Packing of the character set forth in claim 1 wherein the face of the packing ring lying in contact with the backing ring is provided with two annular projections of wedge-shaped tapering cross-section having a flat circular annular edge between them, and said face of the backing ring engaged by said face of the packing ring being of wedge-shaped cross-section conforming thereto, the inner periphery of said packing ring being formed to snugly embrace the plunger and the outer periphery of said packing ring being tapered to conform to the tapered portion of the wall of the pressure chamber and lying in contact therewith.

4. Packing of the character set forth in claim 1 wherein the face of the packing ring lying in contact with the backing ring is provided with two annular projections of wedge-shaped tapering cross section having a flat circular annular edge between them, the inner face of the backing ring being of cylindrical shape and lying in contact with the plunger and the portion of the said backing ring engaging the packing ring being of wedge-shaped cross-section conforming thereto, the inner periphery of said packing ring being formed to snugly embrace the plunger and the outer periphery of said ring being tapered to conform to the tapered portion of the wall of the pressure chamber and lying in contact therewith.

5. Packing of the character set forth in claim 1 wherein the face of the packing ring lying in contact with the backing ring is provided with two annular portions lying at an angle to each other, one at least of which is of wedge-shaped tapering cross section, said two annular portions of the packing ring being cross-sectionally shaped to conform thereto, the inner periphery of said packing ring being formed to snugly embrace the plunger and the outer periphery of said ring being tapered to conform to the tapered portion of the wall of the pressure chamber and lying in contact therewith.

In testimony whereof I have affixed my signature.

FRITZ FAUDI.